US008512825B2

(12) United States Patent
Kim et al.

(10) Patent No.: US 8,512,825 B2
(45) Date of Patent: *Aug. 20, 2013

(54) OPTICAL FILM AND INFORMATION TECHNOLOGY APPARATUS COMPRISING THE SAME

(75) Inventors: Dong-Ryul Kim, Daejeon (KR); Boong-Goon Jeong, Daejeon (KR); Dae-Woo Nam, Daejeon (KR); Myeong-Geun Ko, Daejeon (KR); Min-Hee Lee, Daejeon (KR); Jun-Geun Um, Daejeon (KR)

(73) Assignee: LG Chem, Ltd. (KR)

( * ) Notice: Subject to any disclaimer, the term of this patent is extended or adjusted under 35 U.S.C. 154(b) by 1181 days.

This patent is subject to a terminal disclaimer.

(21) Appl. No.: 12/319,471

(22) Filed: Jan. 7, 2009

(65) Prior Publication Data

US 2009/0197020 A1 Aug. 6, 2009

(30) Foreign Application Priority Data

Jan. 8, 2008 (KR) ........................ 10-2008-0002347
Jun. 23, 2008 (KR) ........................ 10-2008-0058908

(51) Int. Cl.
*G02B 1/04* (2006.01)

(52) U.S. Cl.
USPC ........................ 428/1.33; 349/118; 525/187

(58) Field of Classification Search
USPC .................. 428/1.3; 349/117–121; 525/185, 525/187
See application file for complete search history.

(56) References Cited

U.S. PATENT DOCUMENTS

| 4,419,399 A | 12/1983 | Ichikawa et al. |
| 4,607,079 A | 8/1986 | Giles, Jr. et al. |
| 4,727,117 A | 2/1988 | Hallden-Abberton et al. |
| 4,877,833 A | 10/1989 | Kondo et al. |
| 5,004,777 A * | 4/1991 | Hallden-Abberton et al. ............................. 524/433 |
| 5,049,313 A | 9/1991 | Frentzel |
| 5,200,492 A | 4/1993 | Ohnaga et al. |
| 5,244,862 A | 9/1993 | Bailey |
| 5,344,868 A | 9/1994 | Hallden-Abberton et al. |
| 5,710,216 A | 1/1998 | Weber et al. |
| 5,891,357 A | 4/1999 | Akashi et al. |
| 5,905,554 A * | 5/1999 | Kyu ................................. 349/122 |
| 5,994,022 A | 11/1999 | Tanabe et al. |
| 6,080,833 A | 6/2000 | Otsuji et al. |
| 6,197,898 B1 | 3/2001 | van den Berg et al. |
| 7,704,570 B2 | 4/2010 | Takebe et al. |
| 7,875,328 B2 * | 1/2011 | Um et al. ......................... 428/1.33 |
| 2002/0018163 A1 | 2/2002 | Yamamoto et al. |
| 2002/0039651 A1 | 4/2002 | Murata |
| 2003/0043730 A1 | 3/2003 | Uchiyama et al. |
| 2003/0137620 A1* | 7/2003 | Wang et al. ....................... 349/95 |
| 2004/0063887 A1 | 4/2004 | Toyomasu et al. |
| 2005/0046967 A1 | 3/2005 | Kosaka et al. |
| 2005/0068492 A1 | 3/2005 | Itoh et al. |
| 2005/0117099 A1 | 6/2005 | Yamaoka et al. |
| 2005/0129895 A1 | 6/2005 | Nakamura |
| 2006/0013967 A1 | 1/2006 | Mikoshiba et al. |
| 2006/0055853 A1 | 3/2006 | Murakami et al. |
| 2006/0063105 A1 | 3/2006 | Oberlander et al. |
| 2006/0063858 A1 | 3/2006 | Kang et al. |
| 2006/0066787 A1 | 3/2006 | Yoda et al. |
| 2006/0066946 A1* | 3/2006 | Liu et al. ........................ 359/485 |
| 2006/0093845 A1 | 5/2006 | Chien et al. |
| 2006/0177607 A1 | 8/2006 | Ohmori et al. |
| 2006/0252234 A1 | 11/2006 | Saiki |
| 2007/0141355 A1 | 6/2007 | Kosaka et al. |
| 2007/0172181 A1 | 7/2007 | Imai et al. |
| 2007/0282077 A1 | 12/2007 | Miyamoto et al. |
| 2009/0197020 A1 | 8/2009 | Kim et al. |
| 2009/0275718 A1 | 11/2009 | Um et al. |

FOREIGN PATENT DOCUMENTS

| CN | 101087846 A | 12/2007 |
| EP | 0267574 A | 11/1987 |
| EP | 0483917 A | 10/1990 |
| EP | 0483717 A2 | 5/1992 |
| EP | 0717078 A1 | 6/1996 |
| EP | 1865346 A1 | 12/2007 |
| EP | 1933181 A1 | 6/2008 |
| JP | 62-89705 A | 4/1987 |
| JP | 4146984 A | 5/1992 |
| JP | 4-266957 A | 9/1992 |
| JP | 6155932 A | 6/1994 |
| JP | 7157632 A | 6/1995 |
| JP | 08248202 A | 9/1996 |
| JP | 10-030048 A | 2/1998 |
| JP | 2000256635 A | 9/2000 |
| JP | 2001-220515 A | 8/2001 |
| JP | 2002243943 A | 8/2002 |

(Continued)

OTHER PUBLICATIONS

JPO Website Machine English Translation of JP 2005-070534, Sugiyama et al., Mar. 17, 2005.*
JPO Website Machine English Translation of JP2004-204208, Suzuki Minoru, Jul. 22, 2004.*
Extended European Search Report (EESR) issued on Jul. 5, 2011 in the corresponding European patent application No. 09700270.
U.S. Appl. No. 12/319,472.
U.S. Appl. No. 12/319,469.
U.S. Appl. No. 12/387,549.
Hcengpei Wu et al: "Miscibility of Phenoxy Polymer/Polyacrylate Blends", Macromolecular Chemistry and Physics, Wiley-VCH Verlag, Weinheim, DE, vol. 197 No. 10, Oct. 1, 1996, pp. 3191-3197, XP 000634279.

(Continued)

*Primary Examiner* — Sophie Hon
(74) *Attorney, Agent, or Firm* — Lerner, David, Littenberg, Krumholz & Mentlik, LLP

(57) ABSTRACT

The present invention relates to an optical film that comprises an aromatic based resin comprising a chain having the hydroxy group containing portion and aromatic moiety and a polarizing plate and an information electronic device that include the same. The in-plane retardation $R_{in}$ is in the range of 30 to 600 nm and the thickness retardation $R_{th}$ is in the range of 30 to 400 nm.

18 Claims, No Drawings

(56) References Cited

FOREIGN PATENT DOCUMENTS

| | | |
|---|---|---|
| JP | 2002301788 A | 10/2002 |
| JP | 2003315557 A | 11/2003 |
| JP | 2004045893 A | 2/2004 |
| JP | 2004-204208 A | 7/2004 |
| JP | 2005070534 A | 3/2005 |
| JP | 2005266464 A | 9/2005 |
| JP | 2006220726 A | 8/2006 |
| JP | 2007-031537 A | 2/2007 |
| JP | 2007046044 A | 2/2007 |
| JP | 2007112956 A | 5/2007 |
| JP | 2007169583 A | 7/2007 |
| JP | 2007169586 A | 7/2007 |
| JP | 2007263987 A | 10/2007 |
| JP | 2007321108 A | 12/2007 |
| JP | 2011509434 | 3/2011 |
| KR | 20030069461 A | 8/2003 |
| KR | 20040029251 A | 4/2004 |
| KR | 20040045790 A | 6/2004 |
| KR | 20050065154 A | 6/2005 |
| KR | 20050083709 A | 8/2005 |
| KR | 2005-23083 A | 9/2006 |
| KR | 20070003388 A | 1/2007 |
| KR | 20070113749 A | 11/2007 |
| TW | 200728838 | 8/1995 |
| TW | I304519 A | 9/2003 |
| TW | 200717045 | 5/2007 |
| TW | 200732690 A | 9/2007 |
| WO | 03070849 A1 | 8/2003 |
| WO | 2008/001855 A1 | 1/2008 |

OTHER PUBLICATIONS

Supplementary European Search Report EP 09700848, dated Mar. 18, 2011.
International Search Report PCT/KR2009/000106, dated Aug. 20, 2009.
International Search Report PCT/KR2009/000105, dated Aug. 26, 2009.
Office Action from KR Application No. 10-2009-0001500, dated Feb. 8, 2011.
Office Action from KR Application No. 10-2009-0001501, dated Feb. 8, 2011.
Young Soo Soh: "Miscibility of Polymethyl Methacrylate With Poly (Hidroxy Ether) of Bisphenol A" Journal of Applied Polymer Science, John Wiley and Sons Inc. New York, US, vol. 45, No. 10, Aug. 5, 1992, pp. 1831-1835 XP 000281210.
Chinese Office Action for 200980101851.2 dated Feb. 29, 2012.
Supplementary European Search Report for EP09739004 dated Mar. 22, 2012.
Office Action from Taiwan for Application No. 098100472 dated Jul. 11, 2012.
Office Action from Taiwan counterpart application No. 098114364 dated Aug. 24, 2012.
Extended European Search Report for Application No. EP09739003 dated Oct. 18, 2012.
JPO Website Machine English Translation of JP 2004-204208, Suzuki, Jul. 22, 2004.
International Search Report, PCT/KR2009/002303, dated Dec. 12, 2009.
International Search Report, PCT/KR2009/002302, dated Nov. 10, 2009.
U.S. Appl. No. 12/319,472, filed Jan. 7, 2009.
U.S. Appl. No. 12/319,469, filed Jan. 7, 2009.
U.S. Appl. No. 12/387,549, filed May 4, 2009.
Office Action from Taiwan for Application No. 098100477 dated Nov. 20, 2012.

* cited by examiner

OPTICAL FILM AND INFORMATION TECHNOLOGY APPARATUS COMPRISING THE SAME

TECHNICAL FIELD

The present invention relates to an optical film, which has excellent heat resistance, durability, processability, and optical transparency, low haze, an excellent optical property, is not easily broken, excellent mechanical strength, a reduced light leakage phenomenon, and easily controlled in-plane retardation and thickness retardation, and a polarizing plate and an information electronic device including the same.

This application claims priority from Korean Patent Application Nos. 10-2008-0002347 and 10-2008-0058908 filed on Jan. 8, 2008 and Jun. 23, 2008 in the KIPO, the disclosure of which is incorporated herein by reference in its entirety.

BACKGROUND ART

Recently, display technologies using various methods such as a plasma display panel (PDP), a liquid crystal display (LCD) and the like that are used instead of a known braun tube in accordance with the development of optical technologies are suggested and sold. The higher properties of the polymer material for displays are required. For example, in the case of the liquid crystal display, according to the development toward the thin film, the lightness, and enlargement of the picture area, the wide viewing angle, the high contrast, the suppression of change in picture color tone according to the viewing angle and the uniformity of the picture display are particularly considered as important problems.

Therefore, various polymer films such as a polarizing film, a polarizer protection film, a retardation film, a plastic substrate, a light guide plate and the like are used, and as the liquid crystal, various modes of liquid crystal displays such as twisted nematic (TN), super twisted nematic (STN), vertical alignment (VA), in-plane switching (IPS) liquid crystal cells are developed. Since these liquid crystal cells have all intrinsic liquid crystal alignment, the intrinsic optical anisotropic property is ensured, and in order to compensate the optical anisotropic property, a film in which a retardation function is provided by stretching various kinds of polymers has been suggested.

In detail, since a liquid crystal display device uses high birefringence property and alignment of liquid crystal molecules, the birefringences are different according to the viewing angle and thus the color and brightness of the picture are changed. Thus, a retardation compensation according to the kind of liquid crystal molecule is required. For example, since most liquid crystal molecules that are used in a vertical alignment manner have the thickness refractive index that is larger than the average in-plane refractive index in a liquid crystal display surface, in order to compensate this, a compensation film in which the thickness refractive index is smaller than the average in-plane refractive index is required.

In addition, light does not pass through the front sides of two polarizing plates that are vertical to each other, but if the angle is inclined, the light axes of two polarizing plates are not vertical to each other, thus light leakage occurs. In order to compensate this, the compensate film having the in-plane retardation is required. In addition, the display device using the liquid crystal requires both the thickness retardation compensation and the in-plane retardation compensation in order to widen the angle view.

Requirement of the retardation compensation film is to easily control the birefringence. However, the film birefringence is formed by a basic birefringence which belongs to the material and the orientation of polymer chains in the film. The orientation of the polymer chains is mostly forcibly performed by force applied from the outside or is caused by the intrinsic properties of the material, and the orientation method of the molecules by the external force is to uniaxially or biaxially stretch the polymer film.

In the related art, there is a need to develop a polymer material that satisfies the above requirement properties in order to be used in displays.

DISCLOSURE

Technical Problem

It is an object of the present invention to provide a resin composition for transparent goods, which has excellent optical property and optical transparency, and low haze, is not easily broken unlike an acryl based film that is easily broken while stretching processes are carried out, has excellent mechanical strength, processability, and durability such as heat resistance, a reduced light leakage phenomenon, and various in-plane retardations and thickness retardations.

Technical Solution

The present invention provides an optical film that comprises an aromatic based resin comprising a chain having the hydroxy group containing portion and aromatic moiety. The in-plane retardation is in the range of 0 to 600 nm and the thickness retardation is in the range of 0 to 400 nm.

In addition, the present invention provides a polarizing plate that comprises a polarizer, and the optical film which is provided on at least one side of the polarizer.

In addition, the present invention provides a liquid crystal display device comprising the polarizing plate.

In addition, the present invention provides an information electronic device comprising the optical film.

Advantageous Effects

A optical film according to the present invention is capable of providing optical goods having excellent optical property and optical transparency, and low haze, is not easily broken unlike an acryl based film that is easily broken while stretching processes are carried out, has excellent mechanical strength, processability, and heat resistance, and an optical film that is manufactured by using the resin composition according to the present invention may have a reduced light leakage phenomenon, and easily controlled in-plane retardations and thickness retardations. Accordingly, the optical goods may be applied to IT (information and electron) devices such as display devices and the like for various purposes.

BEST MODE

According to an embodiment of the present invention, there is provided an optical film that comprises an aromatic based resin comprising a chain having the hydroxy group containing portion and aromatic moiety. The in-plane retardation is in the range of 0 to 600 nm and the thickness retardation is in the range of 0 to 400 nm.

The optical film may further comprises a (meth)acrylate based resin comprising one or more (meth)acrylate based derivatives.

In the present invention, the (meth)acrylate based resin may provide a retardation property in which a thickness refractive index is larger than an in-plane average refractive index to a film, and the aromatic based resin having the chain having the hydroxy group containing portion and aromatic moiety may provide a retardation property in which the thickness refractive index is smaller than the in-plane average refractive index. The retardation property of the optical film varies according to the composition of each component of the optical film, the stretching, the stretching direction, the stretching ratio, and the stretching method such as uniaxial or biaxial stretching. Therefore, in the present invention, by controlling the composition of each component and the stretching method, since the films that have various retardation properties may be manufactured, the film having excellent optical property may be manufactured. In addition, by controlling the composition and the stretching method, the optical film having little residual retardation may be provided.

In addition, the resin composition according to the present invention is capable of providing an optical film having excellent mechanical properties unlike an acryl based film that is easily broken. In addition, the (meth)acrylate based resin is capable of providing excellent optical properties, and the aromatic based resin having the chain having the hydroxy group containing portion and aromatic moiety is capable of providing excellent miscibility with the compound comprising the (meth)acrylate based resin. In addition, the optical film according to the present invention has excellent mechanical property including toughness by the aromatic based resin having the chain having the hydroxy group containing portion and aromatic moiety.

The optical film according to the present invention may further include a cyclic based unit having a cyclic portion. The cyclic based unit having the cyclic portion may be included in the (meth)acrylate based resin, or may be included as a separate compound in respects to the (meth)acrylate based resin or the resin that has the chain and aromatic moiety having the hydroxy group containing portion. The cyclic based unit having the cyclic portion may provide excellent heat resistance to the film.

The optical film according to the present invention may control the miscibility of the resin composition according to the contents of a (meth)acrylate based resin, a aromatic based resin having a chain having the hydroxy group containing portion and aromatic moiety, and the cyclic based unit having the cyclic portion.

The content of each resin is not particularly limited, and in consideration of the role of each component, in order to obtain desired in-plane retardation, thickness retardation, optical property, mechanical property, transparency, miscibility and the like, the content of each unit may be determined.

For example, the contents of the (meth)acrylate based resin, the aromatic based resin having a chain having the hydroxy group containing portion and aromatic moiety and the cyclic based unit having a cyclic portion each may be selected within a range of about 0.1 to 99% by weight. To be specific, it is preferable that the content of the (meth)acrylate based resin is in the range of about 39 to about 98% by weight, the content of the aromatic based resin having a chain having the hydroxy group containing portion and aromatic moiety is in the range of about 0.5 to about 60% by weight, and the content of the cyclic based unit having a cyclic portion is in the range of about 0.5 to about 40% by weight.

In the present invention, the compound comprising the (meth)acrylate based resin, the aromatic based resin having a chain having the hydroxy group containing portion and aromatic moiety, or the cyclic based unit having a cyclic portion may be a homopolymer or a copolymer, and within a range in which the object of the present invention is not spoiled, a comonomer may be further included. The copolymer may be a random or block copolymer.

In the present invention, it should be understood that the (meth)acrylate based resin may include (meth)acrylate and a (meth)acrylate derivative. To be specific, as the (meth)acrylate based monomer, there are methyl methacrylate, methyl acrylate, ethyl acrylate, butyl acrylate, 2-ethylhexyl methacrylate, lauryl methacrylate, benzyl methacrylate and the like, but it is not limited thereto. In particular, it is most preferable that methyl methacrylate (MMA) is used.

The (meth)acrylate based resin may be a homopolymer or a copolymer of the (meth)acrylate based derivative, and may be a copolymer comprising another kind of comonomer.

In the present invention, as the (meth)acrylate based resin, a copolymer comprising the (meth)acrylate based unit and the cyclic based unit having the cyclic portion may be used. In the case of when the (meth)acrylate based resin includes the cyclic based unit having a cyclic portion, the (meth)acrylate based resin may include the copolymer including at least one two kinds or more of the (meth)acrylate based derivative and the cyclic based unit. The content of the (meth)acrylate based unit in the copolymer comprising the cyclic based unit having the (meth)acrylate based unit and the cyclic portion is in the range of about 50 to 99% by weight, and preferably in the range of about 70 to about 98% by weight, and the content of the cyclic based unit having the cyclic portion is in the range of about 1 to 50% by weight and preferably about 2 to about 30% by weight. When the content of the cyclic based unit having the cyclic portion is 50% by weight or less, it is useful to reduce a haze value of the film.

The cyclic based unit having the cyclic portion of the copolymer comprising the (meth)acrylate based unit and the cyclic based unit having the cyclic portion functions to improve heat resistance of the film. Examples of the cyclic based unit having the cyclic portion will be described below. However, it is most preferable that the cyclic based unit having the cyclic portion, which is included in the copolymer in conjunction with the (meth)acrylate based unit, is a maleimide based unit including a maleimide portion. The maleimide based unit may include a cyclic portion that is derived from N-cyclohexylmaleimide, N-phenylmaleimide, N-methylmaleimide, N-butylmaleimide and the like, but is not limited thereto. In particular, it is most preferable that it includes the cyclic portion that is derived from N-cyclohexylmaleimide. However, the above examples are provided to illustrate the present invention, but not to limit the range of the present invention.

The copolymer comprising the (meth)acrylate based unit and the cyclic based unit having the cyclic portion may be manufactured by a method such as a bulk polymerization, a solution polymerization, a suspension polymerization, an emulsion polymerization and the like using a cyclic based monomer such as a (meth)acryl based monomer and a maleimide based monomer.

In the present invention, it is preferable that the number average molecular weight of the aromatic based resin comprising the chain having the hydroxy group containing portion and aromatic moiety is in the range of 1,500 to 2,000,000 g/mol. It is preferable that the aromatic based resin includes the phenoxy based resin. Here, the phenoxy based resin includes a structure in which at least one oxygen radical is bonded to the benzene cycle. For example, the aromatic based resin may include one or more units that are represented by the following Formula 1. the aromatic based resin includes 5 to 10,000 of the unit of the following Formula 1, preferably 5 to 7,000 of the unit of the following Formula 1, and more preferably 5 to 5,000 of the unit of the following Formula 1. In the case of when two kinds or more units of the following Formula 1 are included in the aromatic based resin, they may be included in a random form, an alternating form, or a block form.

[Formula 1]

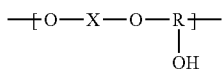

wherein X is a divalent group comprising at least one benzene cycle and R is a straight- or branched-chained alkylene group having 1 to 6 carbon atoms.

To be specific, it is preferable that X is a divalent group that is derived from the compounds of the following Formulas 2 to 4, but is not limited thereto.

[Formula 2]

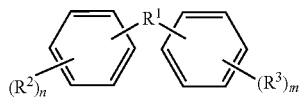

$R^1$ is a direct bond, straight- or branched-chained alkylene having 1 to 6 carbon atoms, or cycloalkylidene having 3 to 20 carbon atoms, $R^2$ and $R^3$ are each hydrogen, straight- or branched-chained alkyl having 1 to 6 carbon atoms, or straight- or branched-chained alkenyl having 2 to 6 carbon atoms, and n and m are each an integer in the range of 1 to 5.

[Formula 3]

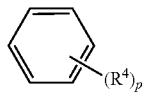

$R^4$ is each hydrogen, straight- or branched-chained alkyl having 1 to 6 carbon atoms, or straight- or branched-chained alkenyl having 2 to 6 carbon atoms, and p is an integer in the range of 1 to 6.

[Formula 4]

$R^6$ and $R^7$ are each a direct bond, straight- or branched-chained alkylene having 1 to 6 carbon atoms, or cycloalkylidene having 3 to 20 carbon atoms, $R^5$ and $R^8$ are each hydrogen, straight- or branched-chained alkyl having 1 to 6 carbon atoms, or straight- or branched-chained alkenyl having 2 to 6 carbon atoms, and q and r are each an integer in the range of 1 to 5.

Detailed examples of the compounds that is represented by Formulas 2 to 4 are the same as the following compounds, but are not limited thereto.

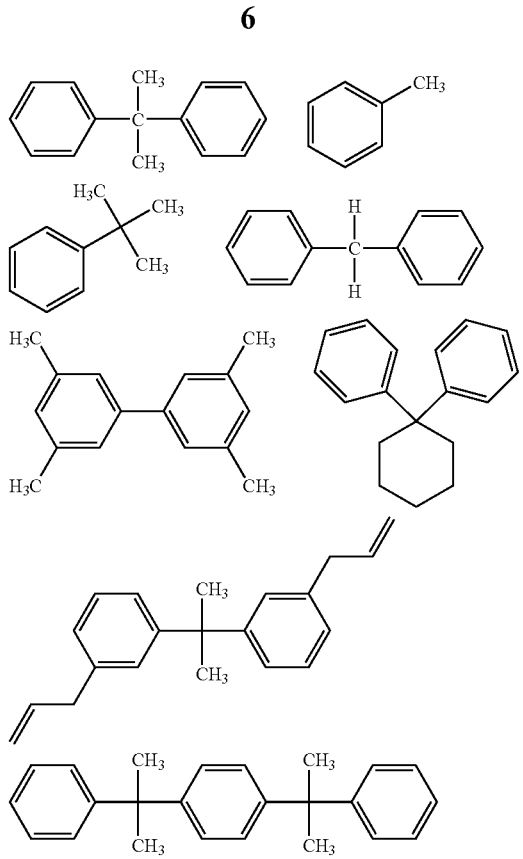

It is most preferable that (b) the aromatic based resin includes one kind or more 5 to 10,000 phenoxy based units that are represented by the following Formula 5.

[Formula 5]

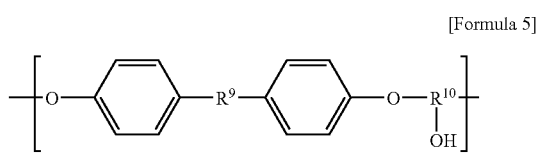

wherein $R^9$ is a direct bond, straight- or branched-chained alkylene having 1 to 6 carbon atoms, and $R^{10}$ is a direct bond, straight- or branched-chained alkylene having 1 to 6 carbon atoms.

It is preferable that Formula 5 is represented by the following Formula 6.

[Formula 6]

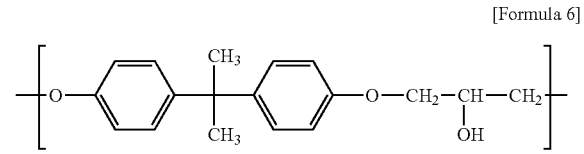

An end of the aromatic based resin may be an OH group.

In the present invention, (c) the unit may improve the heat resistance of the film. The content of (c) unit is in the range of about 0.1 to about 99% by weight, and preferably about 0.5 to about 40% by weight. Examples of the cyclic portion of (c) the unit include maleic anhydride, maleimide, glutaric anhydride, glutalimide, lactone and lactame, but are not limited thereto.

According to an embodiment of the present invention, as the component of the resin composition, 1) a copolymer comprising the (meth)acrylate based unit and the maleimide based unit, and 2) the phenoxy based (phenoxy-based) resin may be used. In this case, it is preferable that the content of each component is in the range of 1 to 99% by weight. To be specific, the content of 1) the copolymer is preferably in the range of about 40 to about 99% by weight and more preferably in the range of about 75 to about 98% by weight. The content of the 2) resin is preferably in the range of about 0.5 to about 60% by weight and more preferably in the range of about 1 to about 30% by weight. In particular, in the case of when the content of the maleimide based monomer in the copolymer comprising 1) the (meth)acrylate based unit and maleimide based unit is 50% by weight or less, regardless of the mixing ratio of 1) to 2) components, it can show miscibility in respects to the entire range, and the optical film having the above composition is advantageous in that it has a single glass transition temperature $T_g$.

The thickness of the optical film that is manufactured by using the resin composition according to the present invention is in the range of 5 to 500 μm, and more preferably 5 to 300 μm, but is not limited thereto. The light penetration of the optical film is 90% or more, the haze property is 2.5% or less, preferably 1% or less, and more preferably 0.5% or less. It is preferable that the glass transition temperature of the optical film is 100° C. or more.

The optical film according to the present invention may be manufactured by using the steps of preparing the above resin composition; and shaping the film using the resin composition. The optical film may be further uniaxially or biaxially stretched.

The resin composition may be manufactured by melting, mixing, and blending the above components. The melting and the mixing of the components may be carried out by using an extruding machine.

The resin composition may further include a lubricant, an antioxidant, a UV stabilizer and absorber, a thermal stabilizer and the like that are generally used.

When the optical film is manufactured, a method that is known in the art may be used, and in detail, an extrusion molding method may be used. For example, after the resin composition is dried under a vacuum and removes dissolved oxygen, the composition is supplied from the raw material hopper to a single or twin extrusion machine that is substituted with nitrogen in respects to the extrusion machine, and melted at a high temperature to obtain a raw material pellet, the obtained raw material pellet is dried under a vacuum, melted from the raw material hopper to a single extrusion machine that is substituted with nitrogen, passes through a coat hanger type T-die, and a chrome-coated casting roll and a drying roll to manufacture the film.

The optical film according to the present invention may have an optical property in which $R_{in}>0$, $R_{th}>0$ by uniaxial or biaxial stretching. For example, by uniaxially stretching the optical film according to the present invention like the step c), the A-plate retardation film that is the retardation film having the optical property in which $R_{in}>0$ and $R_{th}=R_{in}/2$ may be manufactured.

The stretching process may be carried out by using any one of a longitudinal direction (MD) stretching and a transverse direction (TD) stretching or both of the longitudinal direction stretching and the transverse direction stretching. In the case of when both of the longitudinal direction stretching and the transverse direction stretching are carried out, any one of them may be first carried out and then the other may be carried out, or both of them may be carried out simultaneously. The stretching may be carried out through a single step or through multisteps. In the case of when the stretching is carried out in the longitudinal direction, the stretching may be carried out by using a difference in speed between rolls, and in the case of when the stretching is carried out in the transverse direction, the tenter may be used. The rail initiating angle of the tenter is 10° or less, a bowing phenomenon that occurs when the transverse direction stretching is carried out is suppressed, and the angle of the optical axis is regularly controlled. By carrying out the transverse direction stretching through multisteps, the suppression phenomenon of the bowing phenomenon may be obtained.

The stretching may be carried out at a temperature in the range of (Tg−20° C.) to (Tg+30° C.) when the glass transition temperature of the resin composition is $T_g$. The glass transition temperature means a range from a temperature at which storage elasticity of the resin composition starts to be reduced and the loss elasticity starts to be larger than the storage elasticity to a temperature at which orientation of the polymer chain is loosened and removed. The glass transition temperature may be measured by using a differential scanning calorimeter (DSC).

In the case of a small stretching machine (Universal testing machine, Zwick Z010), it is preferable that the stretching rate is in the range of 1 to 100 mm/min. In the case of a pilot stretching machine, it is preferable that the stretching rate is in the range of 0.1 to 2 mm/min. In addition, it is preferable that the film is stretched by using a stretching ratio in the range of 5 to 300%.

The stretching may be carried out through a separate step that is different from the shaping of the film, or carried out through one step in the same process as the shaping of the film. The optical film according to the present invention may have a retardation property that is different from that before the stretching is performed by uniaxially or biaxially performing the stretching using the above method.

By appropriately combining the composition, the longitudinal direction stretching ratio, the transverse direction stretching ratio, the stretching temperature and the stretching rate of the aromatic based resin comprising the (meth)acrylate based resin and the chain and aromatic moiety having the hydroxy group containing portion with each other, the optical film that is capable of being used as the retardation film for compensating the viewing angle of the liquid crystal display may be easily manufactured. In order to obtain uniformity in respects to physical properties of the optical film, it is preferable that the thickness deviation of the raw cloth of the film before it is stretched is about 3% of the thickness of the film. In order to stably realize the desired retardation of the stretched film, it is preferable that the retardation of the raw cloth of the film before it is stretched is as small as possible, and it is preferable that it is 5 nm or less on the basis of retardation (the multiplication of the in-plane birefringence difference and the thickness of the film). In order to obtain the retardation uniformity in the MD and TD, it is preferable that the retardation deviation of the raw cloth of the film before it is stretched is 5 nm or less.

In addition, since toughness of the stretched film is increased, a disadvantage of the (meth)acrylate based film that is easily broken may be effectively compensated.

According to an embodiment of the present invention, in the optical film, the in-plane retardation is in the range of 0 to 600 nm, and the thickness retardation is in the range of 0 to 400 nm. The optical film may be used as a polarizer protective film. At this time, it is preferable that the moisture permeation of the optical film is in the range of 2 to 100 g/m² day.

According to another embodiment of the present invention, in the optical film, the in-plane retardation is in the range of 0 to 100 nm and preferably 30 to 80 nm, and the thickness retardation is in the range of 0 to 300 nm and preferably 100 to 250 nm. The optical film may be used as a retardation film for VA mode liquid crystal display device.

According to another embodiment of the present invention, in the optical film, the in-plane retardation is in the range of 0 to 300 nm and preferably 170 to 210 nm, and the thickness retardation is in the range of 0 to 250 nm and preferably 170 to 210 nm. The optical film may be used as a retardation film for TN mode liquid crystal display device.

According to another embodiment of the present invention, in the optical film, the in-plane retardation is in the range of 0 to 200 nm and preferably 70 to 130 nm, and the thickness retardation is in the range of 0 to 200 nm and preferably 30 to 90 nm. The optical film may be used as a retardation film for IPS mode liquid crystal display device.

The in-plane retardation value and the thickness retardation value of the retardation film according to the present invention may be each calculated by using the following Equations 1 and 2.

$$R_{in} = (n_x - n_y) \times d \quad \text{[Equation 1]}$$

$$R_{th} = [(n_x + n_y)/2 - n_z] \times d \quad \text{[Equation 2]}$$

In Equations 1 and 2, $n_x$ is the largest refractive index among in-plane refractive indexes of the film, $n_y$ is the refractive index in a direction that is vertical to $n_x$ of the in-plane refractive index of the film, $n_z$ is the thickness refractive index of the film, and d is the thickness of the film.

The optical film according to the present invention may be provided with an additional layer comprising at least one of an organic substance and an inorganic substance on at least one side, and an adhesion property in respects to a retardation value, a compensation property and/or a polarizer may be controlled. Examples of the organic substance include cellulose, polyimide, polyester, polyurethane, liquid crystal and/or a derivative thereof, and examples of the inorganic substance include $TiO_2$, ITO and the like, but are not limited thereto.

In addition, the present invention provides an integral polarizing plate that comprises a polarizer and the optical film that is provided on at least one side of the polarizer. Since a polarizer comprises a dichromic pigment and consists of a polyvinyl alcohol film that is uniaxially stretched, it is very weak and has the reduced durability in respects to the temperature or moisture, and laminated with the protective film. The current main protective film for polarizing plate is a triacetyl cellulose (TAC) film.

Since the TAC film has excellent moisture permeation, in a process for manufacturing the polarizing plate, it is advantageous in that moisture contained in the polarizer may be volatilized through the film.

However, under the high temperature and high humidity atmosphere, the dimensional change according to the absorption or the optical property change is relatively significant and in the case of when the humidity is changed at around room temperature, a change in retardation value is large, and there is a limit in improvement of the stable angle view, thus there is a problem in that the durability of the optical property of the polarizing plate is reduced.

In addition, in a polycarbonate-based film, since the glass transition temperature is high, the stretching process is required at high temperatures, and since the light elasticity-coefficient of the film is large, light deformation occurs by the stress. In the case of when the norbornene-based film is stretched, there are problems in that the stress is increased in the stretching or the stress nonuniformity occurs in the stretching. The solving of the above problems is capable of being solved by adopting the acryl-based retardation film having the excellent angle view compensation effect and a small change in retardation value even though the environment is changed.

The optical film according to the present invention may be provided on one side of the polarizer or on both sides of the polarizer. In particular, the optical film according to the present invention may be disposed on a side that is contacted with the liquid crystal cell of the polarizer or a side that is opposite to the liquid crystal cell, but it is preferable that it is disposed on the side that is contacted with the liquid crystal cell.

In the case of when the optical film according to the present invention is provided on only any one side of the polarizer, a protective film that is known in the art may be provided on the other side thereof. As the protective film that is known in the art, a triacetate cellulose (TAC) film, a polynorbonene-based film that is produced by using a ring opening metathesis polymerization (ROMP), a HROMP (ring opening metathesis polymerization followed by hydrogenation) polymer film that is obtained by hydrogenating the ring opening cyclic olefin-based polymer again, a polyester film, a polynorbonene-based film that is produced by the addition polymerization and the like may be used. In addition to this, a film that is produced by using a transparent polymer material may be used as the protective film, but not limited thereto.

In the case of when the optical films according to the present invention are provided on both sides of the polarizer, they may have the same retardation value, but may have the different retardation values.

As the polarizer, a film that consists of polyvinyl alcohol (PVA) comprising iodine or a dichromic dye may be used. The polarizing film may be produced by dyeing iodine or the dichromic dye on the PVA film, but the production method thereof is not particularly limited thereto. In the present specification, the polarizing film means a state that does not comprise the protective film, and the polarizing plate means a state that comprises the polarizing film and the protective film.

In the present invention, the protection film and the polarizer may be combined by using the method that is known in the art.

For example, the combination of the protection film and the polarizing film may be performed by using an attachment process using an adhesive. That is, first, the adhesive is coated on the surface of the PVA film that is the protective film of the polarizing film or the polarizing film by using a roll coater, a gravure coater, a bar coater, a knife coater, a capillary coater, or the like. Before the adhesive is completely dried, the protective film and the polarizing film are combined with each other using heat pressing or pressing at normal temperature by means of a combination roll. When a hot melt type adhesive is used, it is required that the heat pressing roll is used.

Examples of the adhesive which is capable of being used to combine the protection film and the polarizing plate comprise, but are not limited to a one- or two-liquid type polyvinyl alcohol (PVA) adhesive, a polyurethane adhesive, an epoxy adhesive, a styrene-butadiene rubber (SBR) adhesive, a hot melt adhesive and the like. If the polyurethane adhesive is to be used, it is preferable to use the polyurethane adhesive produced by using an aliphatic isocyanate compound which does not cause yellowing due to light. If an one- or two-liquid type dry laminate adhesive or an adhesive having relatively low reactivity in respects to isocyanate and a hydroxy group is used, a solution type adhesive which is diluted with an acetate solvent, a ketone solvent, an ether solvent, or an aromatic solvent may be used. At this time, it is preferable that the adhesive have low viscosity of 5000 cps or less. Preferably, the adhesive has excellent storage stability and light transmittance of 90% or more at a wavelength of 400 to 800 nm.

Any adhesive may be used as long as the adhesive has desirable adhesion strength. It is preferable that the adhesive be sufficiently cured by heat or ultraviolet rays after the combination so that mechanical strength required in the adhesive is ensured, and interfacial adhesion strength is large so that stripping does not occur as long as any one of both sides of the film to which the adhesive is attached is not destroyed.

Specific examples of the adhesive may comprise natural rubber, synthetic rubber, or elastomer having excellent optical transparency, a vinyl chloride/vinyl acetate copolymer, polyvinyl alkyl ether, polyacrylate, denatured polyolefin adhesive, and a curable adhesive containing a curing agent such as isocyanate.

In addition, the present invention provides a liquid crystal display that comprises the polarizing plate.

For example, the liquid crystal display device according to the present invention is a liquid crystal display device comprising a liquid crystal cell and a first polarizing plate and a second polarizing plate that are provided on both sides of the liquid crystal cell, and at least one of the first polarizing plate and the second polarizing plate is the polarizing plate according to the present invention. It is preferable that the optical film or the polarizer protective film that are provided on the side that is opposite to the liquid crystal cell of the polarizing plate includes a UV absorbing agent.

In the case of when the liquid crystal display device according to the present invention includes the above polarizing plate, between the polarizing plate and the liquid crystal cell, one or more optical films according to the present invention may be further included.

In addition, the present invention provides an information electronic device comprising the optical film. Examples of the information electronic device include display devices such as a liquid crystal display (LCD), an organic light emitting diode (OLED) and the like.

In one embodiment, the liquid crystal display according to the present invention is a liquid crystal display device comprising a liquid cell, and a first polarizing plate and a second polarizing plate that are provided on both sides of the liquid crystal cell, and between at least one of the first polarizing plate and the second polarizing plate and the liquid crystal cell, the optical film according to the present invention may be provided. That is, between the first polarizing plate and the liquid crystal cell, between the second polarizing plate and the liquid crystal cell, or both between the first polarizing plate and the liquid crystal cell and between the second polarizing plate and the liquid crystal cell, one or more optical films according to the present invention may be provided.

MODE FOR INVENTION

Hereinbelow, the present invention will be described in detail with reference to Examples. The present invention may, however, be embodied in many different forms and should not be construed as being limited to the Examples set forth herein. Rather, these Examples are provided to fully convey the concept of the invention to those skilled in the art.

EXAMPLES 1 to 5

As the poly(N-cyclohexylmaleimide-co-methylmethacrylate) resin, the IH830HR resin manufactured by LGMMA, Co., Ltd. was used. As the phenoxy based resin, phenoxy resin InChemRez Phenoxy PKFE® resin manufactured by InChem Corporation was used.

The resin composition in which the poly(N-cyclohexylmaleimide-co-methylmethacrylate) resin and the phenoxy based (PKFE) resin were uniformly mixed with each other at a weight ratio of 90:10 to 50:50 was supplied to the extruding machine that was substituted by nitrogen from the raw material hopper to the extruding machine and had the size of 24 φ, and melted at 250° C. to obtain raw material pellets.

The obtained raw material pellets were dried, melted by using the extruding machine at 260° C., and passed through the coat hanger type of T-die, the chrome coated casting roll and the drying roll to manufacture the film having the thickness of 150 μm. By changing the stretching temperature and the stretching ratio using a simple stretching machine for experiment, the stretching was carried out in a uniaxial direction at a rate of 50 mm/min.

The in-plane retardation ($R_{in}$) and the thickness retardation ($R_{th}$) of the film were measured before and after the stretching by using the birefringence measuring device (Axoscan, Axometrics Co., Ltd.). Each retardation value is defined by the following Equations.

$$R_{in}=(n_x-n_y) \times d$$

$$R_{th}=[(n_x+n_y)/2-n_z] \times d$$

wherein $n_x$ is the largest refractive index among in-plane refractive indexes of the film, $n_y$ is the refractive index in a direction that is vertical to $n_x$ of the in-plane refractive index of the film, $n_z$ is the thickness refractive index of the film, and d is the thickness of the film.

COMPARATIVE EXAMPLE

The film was manufactured by using the same method as Examples 1 to 5 and stretched to measure physical properties, except that the film was manufactured by using only the poly(N-cyclohexylmaleimide-co-methylmethacrylate) resin while the phenoxy based (PKFE) resin was not included. The compositions of the resins in Examples 1 to 5 and Comparative Example, and the in-plane retardation value and the thickness retardation value of the optical film according to the uniaxial stretching condition are described in the following Table 1.

TABLE 1

| Example | phenoxy resin content (wt %) | stretching temperature (□) | stretching ratio (%) | Rin (nm) | Rth (nm) |
|---|---|---|---|---|---|
| Example 1 | 10% | 120 | 25 | 41.1 | 21.0 |
|  |  | 120 | 50 | 61.9 | 31.2 |
|  |  | 120 | 100 | 61.5 | 31.2 |
| Example 2 | 15% | 115 | 100 | 143 | 79.3 |
| Example 3 | 20% | 113 | 100 | 228.2 | 124.6 |
| Example 4 | 30% | 110 | 25 | 150.3 | 74.7 |
|  |  | 110 | 50 | 208.4 | 106.4 |
|  |  | 110 | 100 | 306.5 | 154.3 |
| Example 5 | 50% | 106 | 25 | 339.5 | 169.0 |
|  |  | 106 | 50 | 486.4 | 244.0 |
|  |  | 106 | 100 | 588.7 | 284.2 |
| Comparative Example | 0% | 125 | 25 | 15.7 | −9.1 |
|  |  | 125 | 50 | 20.5 | −11.8 |
|  |  | 125 | 100 | 20.2 | −10.8 |

EXAMPLE 6 to 9

The film was manufactured by using the same method as Examples 1 to 5 and stretched to measure physical properties, except that the biaxial stretching was carried out by using the simple stretching machine for experiment. The results are described in the following Table 2.

TABLE 2

| Example | phenoxy resin content (wt %) | MD direction stretching | | TD direction stretching | | Rin (nm) | Rth (nm) |
|---|---|---|---|---|---|---|---|
| | | stretching temperature (□) | stretching ratio (%) | stretching temperature (□) | stretching ratio (%) | | |
| Example 6 | 10% | 120 | 50 | 120 | 10 | 23.2 | 39.0 |
| | | 120 | 50 | 120 | 20 | 9.4 | 38.5 |
| | | 120 | 50 | 120 | 30 | 33.7 | 60.9 |
| | | 120 | 50 | 120 | 40 | 64.9 | 88.3 |
| Example 7 | 15% | 115 | 50 | 115 | 10 | 44.9 | 82.4 |
| | | 115 | 50 | 115 | 20 | 32.0 | 91.9 |
| | | 115 | 50 | 115 | 30 | 10.2 | 87.1 |
| | | 115 | 50 | 115 | 40 | 84.2 | 155.8 |
| Example 8 | 20% | 113 | 50 | 113 | 10 | 55.0 | 116.7 |
| | | 113 | 50 | 113 | 20 | 43.1 | 126.3 |
| | | 113 | 50 | 113 | 30 | 22.1 | 122.5 |
| | | 113 | 50 | 113 | 40 | 94.0 | 187.6 |
| Example 9 | 30% | 110 | 25 | 110 | 25 | 58.1 | 135.2 |
| | | 110 | 50 | 110 | 50 | 95.2 | 177.0 |

EXAMPLE 10

The film was manufactured by using the same method as Examples 1 to 5, except that the poly(N-cyclohexylmaleimide-co-methylmethacrylate) resin and the phenoxy based (PKFE) resin were uniformly mixed with each other at a weight ratio of 85:15. Various MD direction stretching conditions and TD direction stretching conditions were combined with each other by using the pilot stretching machine to obtain the stretching film, and the measured retardations are described in the following Table 3.

TABLE 3

| | MD stretching | | TD stretching | | | |
|---|---|---|---|---|---|---|
| | stretching temperature (□) | stretching ratio (%) | stretching temperature (□) | stretching ratio (%) | Rin (nm) | Rth (nm) |
| Example 10 | 115 | 60 | 117 | 125 | 49 | 126.5 |
| | 117 | | 120 | 100 | 25 | 102.5 |
| | 117 | | 120 | 125 | 42 | 103.0 |
| | 117 | | 120 | 150 | 53 | 98.5 |
| | 115 | 70 | 117 | 125 | 32 | 127.0 |
| | 117 | | 120 | 100 | 15 | 100.5 |
| | 117 | | 120 | 125 | 29 | 102.5 |
| | 117 | | 120 | 150 | 48 | 104.0 |
| | 117 | | 120 | 150 | 40 | 94.0 |

EXAMPLE 11

The film was manufactured by using the same method as Example 10 and stretched to measure physical properties, except that the poly(N-cyclohexylmaleimide-co-methylmethacrylate) resin and the phenoxy based (PKFE) resin were uniformly mixed with each other at a weight ratio of 80:20. The measured results are described in the following Table 4.

TABLE 4

| | MD stretching | | TD stretching | | | | |
|---|---|---|---|---|---|---|---|
| | stretching temperature (□) | stretching ratio (%) | stretching temperature (□) | Heat fixing temperature (□) | stretching ratio (%) | Rin (nm) | Rth (nm) |
| Example 11 | 114 | 30 | 114 | 100 | 180 | 195 | 181.5 |
| | 114 | 30 | 114 | 105 | 200 | 183 | 172.5 |
| | 114 | 30 | 114 | 110 | 200 | 171 | 160.5 |
| | 114 | 30 | 114 | 100 | 200 | 253 | 234.5 |
| | 114 | 30 | 114 | 105 | 200 | 193 | 173.5 |
| | 114 | 30 | 114 | 105 | 200 | 259 | 232.5 |
| | 114 | 30 | 114 | 110 | 200 | 234 | 212.0 |
| | 114 | 30 | 117 | 100 | 180 | 188 | 186.0 |
| | 114 | 30 | 117 | 100 | 200 | 202 | 190.0 |

TABLE 4-continued

| MD stretching | | TD stretching | | | | |
|---|---|---|---|---|---|---|
| stretching temperature (□) | stretching ratio (%) | stretching temperature (□) | Heat fixing temperature (□) | stretching ratio (%) | Rin (nm) | Rth (nm) |
| 114 | 35 | 114 | 110 | 200 | 218 | 207.0 |
| 114 | 35 | 117 | 100 | 200 | 187 | 182.5 |
| 114 | 35 | 120 | 100 | 200 | 138 | 145.0 |

The moisture permeations of the stretching condition (MD stretching ratio 70%/TD stretching ratio 125%) specimen in Example 10 and the stretching condition (MD stretching ratio 30%/TD stretching ratio 200%) specimen in Example 11 were measured by using the moisture permeation measuring device (PERMATRAN-W Model 398, Mocon, Co., Ltd.) under the condition of 40° C./90% RH. In the case of Example 10, the value was 30 g/m² day, and in the case of Example 11, the value was 34 g/m² day.

If the stretched optical film by Example is used, it may be applied to the optical film having excellent heat resistance, durability, processability, and optical property because optical transparency is excellent, is not easily broken, and has excellent mechanical strength and easily controlled in-plane retardation and thickness retardation.

The invention claimed is:

1. An optical film comprising:
   a copolymer of a (meth)acrylate derivative and maleimide; and
   an aromatic based resin including 5 to 5,000 phenoxy based units that are represented by the following Formula 6:

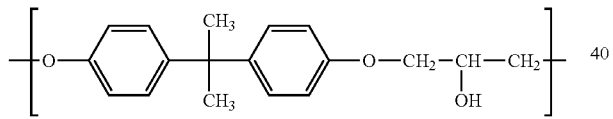

[Formula 6]

wherein:
(A) the in-plane retardation $R_{in}$ according to the following Equation is in the range of 30 to 80 nm and the thickness retardation $R_{th}$ according to the following Equation is in the range of 100 to 250 nm:

$$R_{in}=(n_x-n_y)\times d,$$

$$R_{th}=[(n_x+n_y)/2-n_z]\times d$$

wherein:
(1) $n_x$ is the largest refractive index among in-plane refractive indexes of the optical film;
(2) $n_y$ is the refractive index in a direction that is vertical to $n_x$ of the in-plane refractive index of the optical film; and
(3) $n_z$ is the thickness refractive index of the optical film; and
(B) the aromatic based resin includes a phenoxy based resin including the phenoxy based units that are represented by the Formula 6;
(C) the content of maleimide in the copolymer of (meth) acrylate derivative and maleimide is in the range of about 1% by weight to about 50% by weight; and
(D) the content of the copolymer of the (meth)acrylate derivative and maleimide is in the range of about 40% by weight to about 99% by weight, and the content of the aromatic based resin is in the range of about 1% by weight to about 60% by weight.

2. The optical film as set forth in claim 1, wherein the optical film is a retardation film for VA mode liquid crystal display device.

3. A polarizing plate comprising:
(a) a polarizer; and
(b) the optical film according to claim 1, which is provided on at least one side of the polarizer.

4. A liquid crystal display device comprising: the polarizing plate according to claim 3.

5. An information electronic device comprising: the optical film according to claim 1.

6. The optical film as set forth in claim 1, wherein the aromatic based resin has a number average molecular weight in the range of 1,500 to 2,000,000 g/mol.

7. An optical film comprising:
   a copolymer of a (meth)acrylate derivative and maleimide; and
   an aromatic based resin including 5 to 5,000 phenoxy based units that are represented by the following Formula 6:

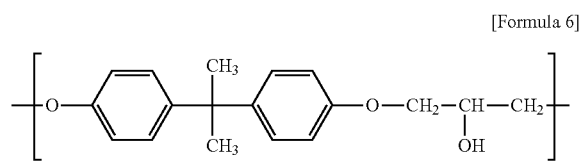

[Formula 6]

wherein:
(A) the in-plane retardation $R_{in}$ according to the following Equation is in the range of 170 to 210 nm and the thickness retardation $R_{th}$ according to the following Equation is in the range of 170 to 210 nm:

$$R_{in}=(n_x-n_y)\times d,$$

$$R_{th}=[(n_x+n_y)/2-n_z]\times d$$

wherein:
(1) $n_x$ is the largest refractive index among in-plane refractive indexes of the optical film;
(2) $n_y$ is the refractive index in a direction that is vertical to $n_x$ of the in-plane refractive index of the optical film; and
(3) $n_z$ is the thickness refractive index of the optical film; and
(B) the aromatic based resin includes a phenoxy based resin including the phenoxy based units that are represented by the Formula 6;

(C) the content of maleimide in the copolymer of (meth) acrylate derivative and maleimide is in the range of about 1% by weight to about 50% by weight; and (D) the content of the copolymer of the (meth)acrylate derivative and maleimide is in the range of about 40% by weight to about 99% by weight, and the content of the aromatic based resin is in the range of about 1% by weight to about 60% by weight.

8. The optical film as set forth in claim 7, wherein the optical film is a retardation film for TN mode liquid crystal display device.

9. The optical film as set forth in claim 7, wherein the aromatic based resin has a number average molecular weight in the range of 1,500 to 2,000,000 g/mol.

10. A polarizing plate comprising:
(a) a polarizer; and
(b) the optical film according to claim 7, which is provided on at least one side of the polarizer.

11. A liquid crystal display device comprising:
the polarizing plate according to claim 10.

12. An information electronic device comprising:
the optical film according to claim 7.

13. An optical film comprising:
a copolymer of a (meth)acrylate derivative and maleimide; and
an aromatic based resin including 5 to 5,000 phenoxy based units that are represented by the following Formula 6:

[Formula 6]

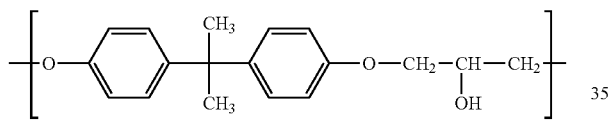

wherein:
(A) the in-plane retardation $R_{in}$ according to the following Equation is in the range of 70 to 130 nm and the thickness retardation $R_{th}$ according to the following Equation is in the range of 30 to 90 nm:

$$R_{in}=(n_x-n_y)\times d,$$

$$R_{th}=[(n_x+n_y)/2-n_z]\times d$$

wherein:
(1) $n_x$ is the largest refractive index among in-plane refractive indexes of the optical film;
(2) $n_y$ is the refractive index in a direction that is vertical to $n_x$ of the in-plane refractive index of the optical film; and
(3) $n_z$ is the thickness refractive index of the optical film; and (B) the aromatic based resin includes a phenoxy based resin including the phenoxy based units that are represented by the Formula 6;

(C) the content of maleimide in the copolymer of (meth) acrylate derivative and maleimide is in the range of about 1% by weight to about 50% by weight; and (D) the content of the copolymer of the (meth)acrylate derivative and maleimide is in the range of about 40% by weight to about 99% by weight, and the content of the aromatic based resin is in the range of about 1% by weight to about 60% by weight.

14. The optical film as set forth in claim 13, wherein the optical film is a retardation film for IPS mode liquid crystal display device.

15. The optical film as set forth in claim 13, wherein the aromatic based resin has a number average molecular weight in the range of 1,500 to 2,000,000 g/mol.

16. A polarizing plate comprising:
(a) a polarizer; and
(b) the optical film according to claim 13, which is provided on at least one side of the polarizer.

17. A liquid crystal display device comprising:
the polarizing plate according to claim 16.

18. An information electronic device comprising:
the optical film according to claim 13.

* * * * *